United States Patent [19]

Moore

[11] 4,055,232

[45] Oct. 25, 1977

[54] POWER STEERING REGULATION FOR AUTOMOBILES

[76] Inventor: Walter A. Moore, 121 Mixer St., Adrian, Mich. 49221

[21] Appl. No.: 734,177

[22] Filed: Oct. 20, 1976

[51] Int. Cl.² .............................................. B62D 5/08
[52] U.S. Cl. .................................... 180/132; 60/489; 137/625.47; 180/141
[58] Field of Search ............... 180/143, 141, 142, 132, 180/154–163; 60/489, 494; 137/625.47

[56] References Cited

U.S. PATENT DOCUMENTS

| 1,773,794 | 8/1930 | Schneider | 180/163 X |
| 2,698,006 | 12/1954 | Wichmann et al. | 180/163 X |
| 3,693,747 | 9/1972 | Nishikawa | 180/143 |

Primary Examiner—Joseph F. Peters, Jr.
Assistant Examiner—John A. Pekar
Attorney, Agent, or Firm—Malcolm W. Fraser

[57] ABSTRACT

A manual regulator for power steering devices of automobiles comprising a valve assembly equipped with a rotary plug valve having a suitable channel and passages enabling selective free or predetermined restricted flow between the hydraulic pump and the steering mechanism, thereby to regulate the effort required of the driver to effect turning of the vehicle. This militates against oversteering and manually adjusts the effort required for the steering operation suitable to the individual driver. Manual adjustment requires only the turning of the valve and subsequent locking of the valve in the adjusted position.

1 Claim, 3 Drawing Figures

POWER STEERING REGULATION FOR AUTOMOBILES

BACKGROUND AND SUMMARY OF THE INVENTION

Power steering systems have been designed in which the power decreases with increased speed, and these work automatically. However, under certain circumstances it is desirable manually to adjust the degree of effort required to effect steering. This is because some people are not strong enough to steer without substantial assistance, whereas others of more muscular type tend to oversteer so that the same power assistance is not required or desired by all persons.

The above difficulty is overcome in an exceedingly simple manner by interposing in the line between the hydraulic pump and the vehicle power steering mechanism a valve assembly, the valve of which can be manually adjusted to one of several positions, so that pressure fluid is passed freely therethrough or is restricted in a predetermined selective manner. In this way greater or less effort is required of the driver to steer the vehicle. After the desired adjustment of the valve is made, the valve is locked in position.

BRIEF DESCRIPTION OF THE DRAWING

FIG. 11 is a vertical sectional view of the assembly shown on FIG. 1 and indicating diagrammatically the hydraulic pump and the vehicle power steering device; and FIG. 111 is a sectional view similar to FIG. II but showing the valve turned to the position at which the power steering is rendered inoperative.

DESCRIPTION OF THE PREFERRED EMBODIMENTS

Figure 1:
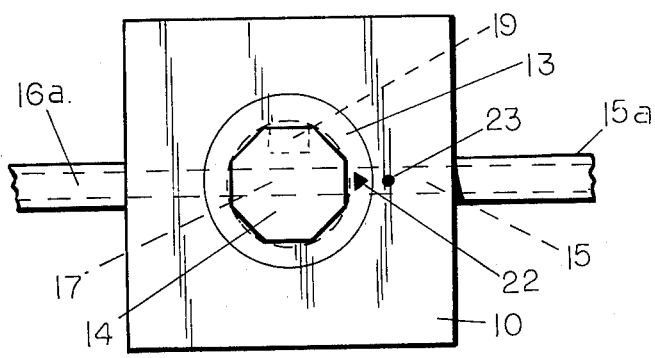
FIG. 1 is a top plan view of the valve housing and manual valve, showing the indicia for visually determining that the valve is in position that full power steering is obtained.
Figure 2:
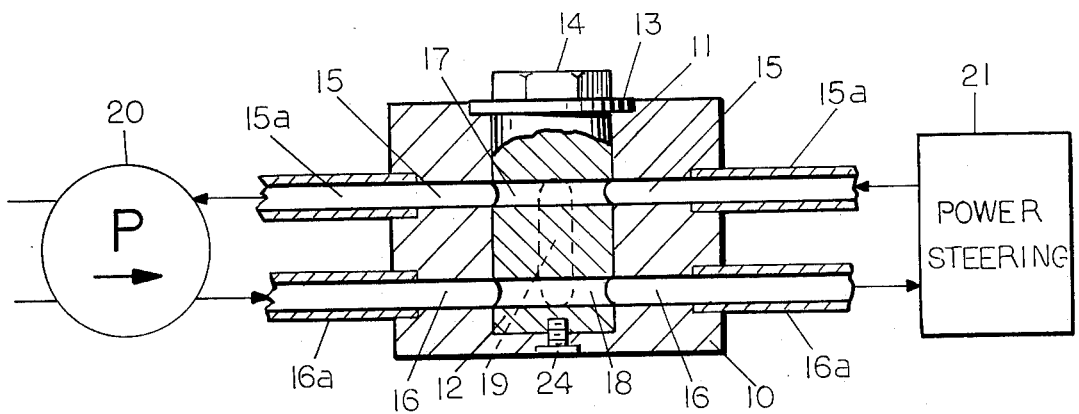
Figure 3:
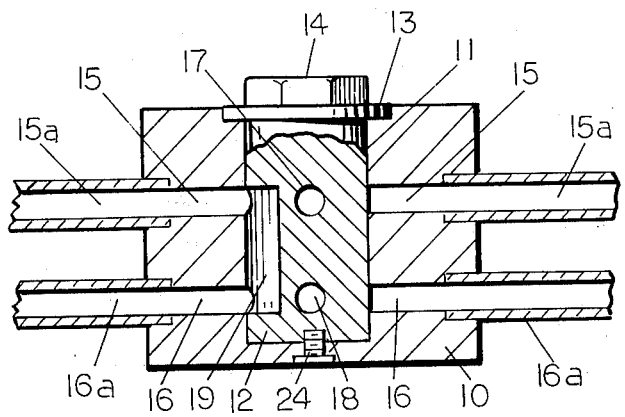

The illustrated embodiment of the invention comprises a valve body 10 which is suitably secured, as by straps, to a vehicle part. The body 10 has a centrally disposed socket 11 in which is mounted a plug valve 12 of uniform diameter throughout so as to turn freely in one direction or the other. On the outer end of the valve 12 is a circular flange 13, which bears against the outer face of the housing 10. Rigid with the flange 13 and projecting outwardly therefrom is a wrench-receiving head 14, which affords the manual means for operably turning the valve.

Formed in the valve body 10 in transverse relation are spaced parallel passages 15 and 16, which are interrupted by the socket 11. These interrupted passages may be placed into respective communication by transverse valve passages 17 and 18 formed in the plug valve 12 so that when turned to the proper position fluid can freely flow from one side of the valve body 10 to the other. By turning the valve so that a solid part of the valve is against the valve body passages 15 and 16, then no passage of fluid through the valve body 10 can take place. Also it will be apparent that by such movement of the valve 12 partially to uncover the passages 15 and 16, a reduced flow of fluid will take place through the body 10. The volume of fluid flow would depend upon the amount the passages 15 and 16 were uncovered.

On one side of the valve body leading from the adjacent ends of the passages 15 and 16 are tubes 15a and 16a respectively, which are threaded in place and lead to a power driven hydraulic pump 20. On the other side of the valve body 10 and in threaded engagement are tubes 15a and 16a for the passages 15 and 16 respectively, and these tubes lead to a vehicle power steering mechanism 21 of a type well known to those skilled in the art.

When the plug valve is turned to the shut-off position where no pressure fluid can pass from the pump 20 to the steering assist 21, a longitudual channel 19 in the valve provides communication from the outlet to the inlet of the pump 20 through the respective tubes 15a and 16a.

In order visually to indicate the position of the plug valve 12 in full steering assist an arrow 22 is on the flange 13 and a dot 23 is on the valve body 10. When these are in alignment, full pressure fluid can pass from the pump 20 to the steering assist mechanism 21. By throttling or restricting such pressure fluid passage by turning the valve 12, a progressively greater effort is required to effect turning.

In order securely to fix the valve 12 in position of adjustment, a removeable set screw 24 in the valve body 10 is engaged in a threaded hole in the lower end of the valve.

Numerous changes in details construction and choice of materials may be effected without departing from the spirit of the invention.

What I claim is:

1. A hydraulic pressure control for use in a power-assisted steering system of a motor vehicle including a source of hydraulic pressure comprising a. a valve body interposed between said source of hydraulic pressure and said steering system and having an inlet passageway communicating with said hydraulic pressure source and said steering system for delivering pressure fluid to the latter, b. an outlet passageway in said valve body parallel to said inlet passageway and also communicating with said steering system and said pressure source to enable return fluid flow to said source, c. a rotary plug valve in said valve body provided with parallel ducts adapted to align respectively with said inlet and outlet passageways, and a channel adapted to connect portions of said inlet and outlet passageways on the hydraulic pressure source side, thereby to enable unrestricted fluid flow and afford relatively easy steering operation, d. said valve being shiftable for selectively restricting or stopping the hydraulic flow therethrough for reducing the sensitivity and ease by which steering is accomplished, or rendering said power-assisted steering system ineffective, e. means on said valve on the outside of said valve body affording manual operating means for said valve, thereby to predetermine the resistance imposed on the steering effort of the operator, f. indicia means on said last means and valve body for visually indicating the adjusted position of the valve, and g. set screw means for securely holding said valve in position of adjustment.

* * * * *